(12) United States Patent
Lohr et al.

(10) Patent No.: US 7,853,547 B1
(45) Date of Patent: Dec. 14, 2010

(54) PRODUCTION RULE MESSAGE FORMATTING AND PARSING SYSTEM

(75) Inventors: Timothy W. Lohr, Manassas, VA (US); James Gamble, Warrenton, VA (US); Talvar Gholar, Woodbridge, VA (US)

(73) Assignee: Lockheed Martin Corp., Bethesda, MD (US)

( * ) Notice: Subject to any disclaimer, the term of this patent is extended or adjusted under 35 U.S.C. 154(b) by 615 days.

(21) Appl. No.: 11/871,148

(22) Filed: Oct. 11, 2007

Related U.S. Application Data

(60) Provisional application No. 60/851,060, filed on Oct. 12, 2006.

(51) Int. Cl.
*G06F 17/21* (2006.01)
*G06F 17/27* (2006.01)
*G06N 5/00* (2006.01)

(52) U.S. Cl. .......................... 706/47; 706/48
(58) Field of Classification Search ............. 706/47
See application file for complete search history.

(56) References Cited

PUBLICATIONS

Naick et al., Business-to-Business Integration Using MQSeries and MQSI Patterns for e-business Series, IBM International Technical Support Organization, Dec. 2000.*

* cited by examiner

*Primary Examiner*—Donald Sparks
*Assistant Examiner*—Nathan H Brown, Jr.
(74) *Attorney, Agent, or Firm*—Wallace G. Walter

(57) ABSTRACT

A message formatting system includes a rules execution engine that coacts with an expandable goal-oriented rules production set to process one or more characters of an input message to output a message formatted in accordance with one or more production rules of the set of production rules. The production rule set contains a plurality of production rules each having a criteria triggerable by one more or characters of the input message to cause execution of that so-triggered rule by the rules execution engine to alter the format of the input message in accordance with an action function or the action functions of the so-triggered rule wherein each production rule includes a first side having a condition or criteria that can be selectively triggered by one or more one or more characters of the input message and a corresponding second side having one or more executable format-altering action functions.

7 Claims, 2 Drawing Sheets

PRODUCTION RULE MESSAGE FORMATTING AND PARSING SYSTEM

CROSS-REFERENCE TO RELATED APPLICATION

This application claims the benefit of commonly owned U.S. Provisional Patent Application 60/851,060 filed Oct. 12, 2006 by the applicants herein, the disclosure of which is incorporated herein by reference.

BACKGROUND OF THE INVENTION

The present invention relates to message formatting and, more particularly, to production-rule based processing of an input data stream, such as a character stream, to efficiently provide an output character stream formatted and/or parsed in accordance with a predetermined structure or scheme.

Strategic command authority messages such as Emergency Action Messages (EAMS) must be organized in one of a plurality of specific transmission formats so that message recipients can authenticate and validate the EAM. The particular message format used is driven by the intended transmission mechanism and transmission mode (satellite, VLF/LF, landline, RF links (MF/HF), etc.) and the message data content. In general, certain delimiting characters that mark message boundaries as well as internal data fields are allowed to vary in a number of acceptable occurrences. The vagaries of the message data and the associated rules are readily accommodated by the human mind, but are difficult to embed within a computer program. However, the volume of messages necessitates computer processing to assist human operators in managing the workload.

Previous solutions have tried to program all of the possible combinations and/or permutations that can occur within the data message; the programming challenge can become intractable as the number of allowed message variations grows because of the possible combinations and permutations.

SUMMARY OF THE INVENTION

A message formatting system includes a rules-execution engine that coacts with an expandable goal-oriented rules production set to process raw or pre-processed messages to output properly formatted and processed messages, such as Emergency Action Messages (EAMS).

In its fundamental form, the rules production set includes a sufficient plurality of rules each having a left-hand side (LHS) and a right-hand side (RHS) with the left-hand side containing test conditions or criteria for the incoming message, data, or character stream and the right-hand side containing action functions that are triggered into execution when the left-hand side test conditions are satisfied by the incoming message, data, or character stream.

The production rule system reacts to patterns of facts to determine a set of actions to perform or execute to attain one or more goals. Patterns comprise combinations of fact existence, fact values, spatial fact relationships (e.g., fact B occurs after fact A in sequence) and temporal fact relationships (e.g., fact A occurs within some time period of fact B). Actions comprise manipulations of data that are possibly unrelated to the observed facts to attain a desired goal or end result, such as changing a transmission encoded message into plain text for human interpretation.

The production rule system is expandable by insertion of additional rules into the production-rule set to accommodate variations to message data since the rules can be added in a manner that is analogous to the categorization and decision process used by the human mind, since a production-rule system can use the detection of fact patterns as another fact that can also be compared to a set of relationships established by the rules.

The solution allows a relatively small expandable set of rules to define formatting and/or parsing actions for a given message even if there is a multitude of acceptable variations within the original message and/or encoded message, respectively.

The full scope of applicability of the present invention will become apparent from the detailed description to follow, taken in conjunction with the accompanying drawings, in which like parts are designated by like reference characters.

DESCRIPTION OF THE PREFERRED EMBODIMENTS

Figure 1:
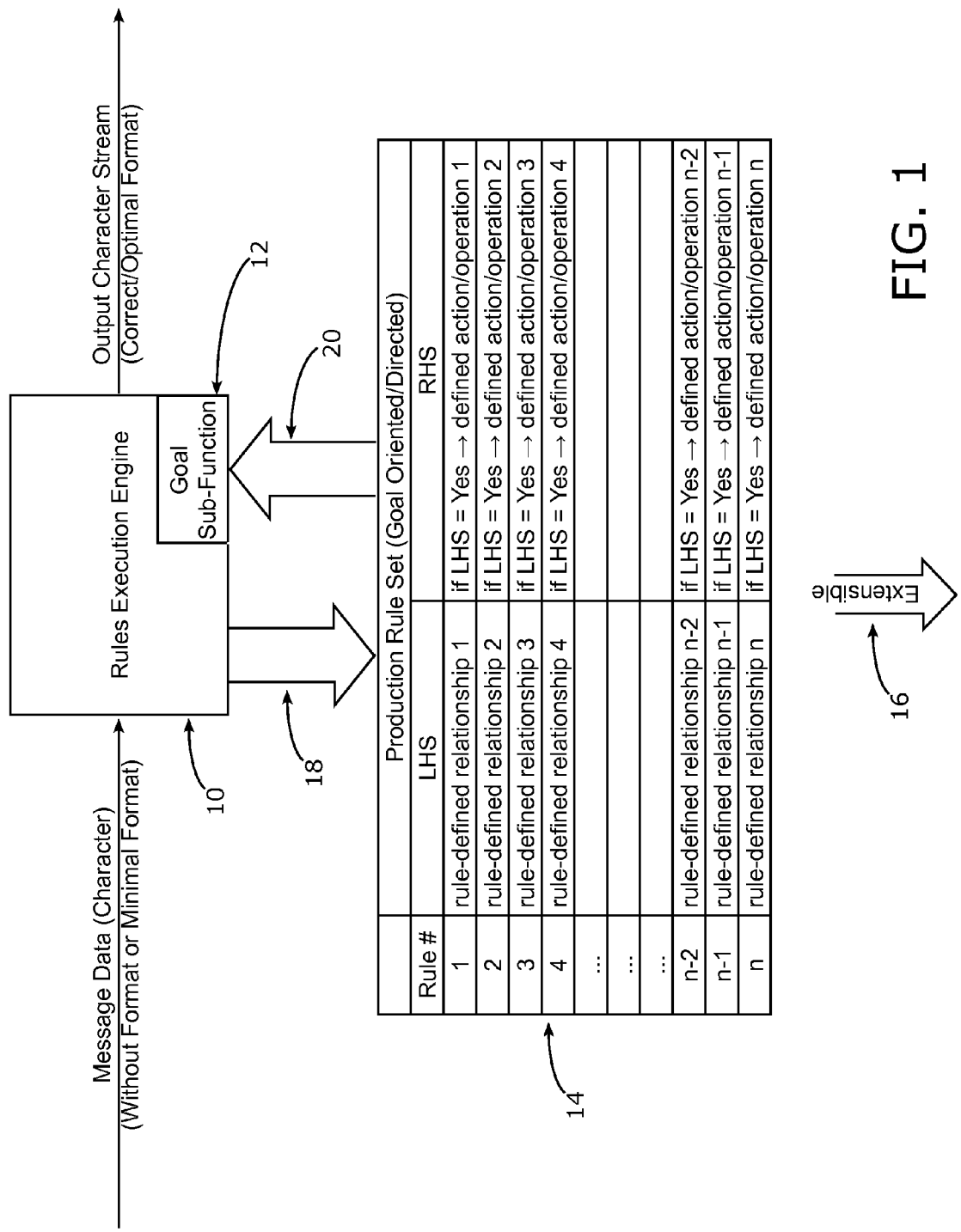
FIG. 1 is an overall view of the basic architecture of a preferred embodiment.

The overall architecture of a preferred embodiment is shown in FIG. 1 and, as shown therein, includes a rules-execution engine 10 that can take the form, for example, of a firmware or software programmed general purpose computer, microprocessor, or special purpose processor (such as a RISC processor). The rules-execution engine 10 can accept as in input, as shown on the left, message characters or streams of message characters or message data without formatting (or with some pre-formatting) and output, as shown the right, message characters or streams of message characters or message data in a correct or optimal format. While not specifically shown in FIG. 1, the input characters can be in a correct or optimal format and the output can be in some other format or processed into a format optimally perceivable by a human reader. As discussed below, a goal sub-function 12 can be provided in the rules-execution engine 10 to resolve inconsistencies in the direction of the desired output. The system also includes a production rule set 14 containing a plurality of production rules 1, 2, 3, 4 . . . , n−2, n−1, n that include a left-hand side LHS and a corresponding right-hand side RHS. As indicated at 16, the production rule set 14 is expandable or extensible by adding new rules as desired. Each rule includes, as its left-hand side, a condition, criteria, or relationship, that, when fired, met, or triggered (e.g., by the input data, message characters, or character stream) causes the corresponding right-hand side operation(s), command (s), or action function(s) to execute. The production rule set 14 and the rules-execution engine 10 are interconnected by logical pathways 18 and 20, or, if desired, by a single bidirectional serial or parallel pathway or bus (not shown).

The logical separation of the production rule set 14 and the rules-execution engine 10 by the logical pathways 18 and 20 means that the production rule set 14 can be expanded as desired without affecting the rules-execution engine 10.

The following representative rule is illustrative of the state changes that occur when the translator recognizes a security tri-graph in a MILSTAR UHF message:

```
<rule name="Found AAA">
    <parameter identifier="states">
        <class>States</class>
    </parameter>
    <java:condition>
        states.getMsgState( ).equals("SOM")
    </java:condition>
    <java:condition>
        states.tokenString.equals("AAA")
    </java:condition>
    <java:consequence>
        states.setClassification("SPECAT");
        states.setDeclass("SPECAT");
        states.setMsgFormat("MILSTAR");
        states.setMsgState("BODY");
        states.setPrecedence("EAM");
    </java:consequence>
</rule>
```

The above rule identifies two conditions. First, that the parser state is SOM, i.e., "looking for start-of-message". Second, that the string "AAA" has been recognized as a token. When both conditions are satisfied, the state of the parser changes so that:

1. the message classification is set to SPECAT,
2. the message declassification is set to SPECAT,
3. the message format is set to MILSTAR (UHF),
4. the parser state changes to BODY, meaning "looking for message body", and
5. the message precedence is set to EAM.

As a second representative example, the following rule illustrates the state changes that occur when the translator recognizes a HIDAR (high data rate) message heading:

```
<rule name="Found HIDAR Heading">
    <parameter identifier="states">
        <class>States</class>
    </parameter>
    <java:condition>
        states.getMsgState( ).equals("SOM")
    </java:condition>
    <java:condition>
        (states.tokenString.equals("ZCZ") ||
         states.tokenString.equals("KKK") ||
         states.tokenString.equals("CZC") ||
         states.tokenString.equals("XLL"))
    </java:condition>
    <java:consequence>
        states.setMsgFormat("HIDAR");
    </java:consequence>
</rule>
```

The above rule identifies two conditions:
1. the parser state is SOM, i.e., "looking for start-of-message", and
2. the most recent token is recognized: "ZCZ", "KKK", "CZC", or "XLL".

When both conditions are satisfied, the state of the parser changes to indicate that the message format is HIDAR.

The following two rules, identified as rule "487L" and "ACP 126," respectively, concern message formatting and include an "activation-group" clause that identifies the rule as part of the "formats" action set (illustrated in FIG. 2, discussed below). In each rule, the "when" clause identifies the beginning of the left-hand side (LHS) tests for facts which, in the example, comprise a single fact test that a string of characters is a specific message format identifier. The "then" clause identifies the start of the right-hand side (RHS) actions that will execute when the LHS test is satisfied. In both example rules, the actions result in the creation of a message header, a body of phonetic letters spelled out (PLSO), and a message footer.

```
Rule "487L"
    activation-group "formats"
    when
        f : FormatObject ( format == "487L" )
    then
        f.addMessageHeaderLine( "VZCZCZCZC<CR><LF>" );
        f.addMessageHeaderLine( "XLL XLL XLL<CR><LF>" );
        f.addMessageHeaderLine( "<@><@><CR><LF>" );
        f.addMessageHeaderLine( "WWW NKO000 <DDTTTT>
            <CR><CR>" );
        f.addMessageHeaderLine( "BT<CR><LF>" );
        f.addMessageHeaderLine( "<CLASS><CR><LF>" );
        f.setPlso( PLSOStateEnum.EITHER );
        f.setAppropriateEndLine(" <CR><LF>" );
        f.addMessageFooterLine( "BT<CR><LF>" );
        f.addMessageFooterLine( "NNNN<CR><LF>");
        f.format( );
    end
```

Rule 487L runs when the format selection is "487L". It designates several message elements to be added to the output as literals with the add MessageHeaderLine and the addMessageFooterLine functions. The actual message text is converted by the setPlso function, and the argument passed directs the rules to convert the text to PLSO (or not) based on meta-data associated with the message text. The format function directs the rules engine to process the above rules and produce the output from the formatting operation.

Rule ACP_126 runs when the format selection is "ACP_126"; the rule functions analogously to rule 487L, but produces different output based on the data provided to the formatting functions.

```
rule "ACP_126"
    activation-group "formats"
    when
        f : FormatObject ( format == "ACP_126" )
    then
        f.addMessageHeaderLine( "<@><DTG><CR><LF>" );
        f.addMessageHeaderLine( "FM <ff><CR><LF>" );
        f.addMessageHeaderLine( "TO <tt><CR><LF>" );
        f.addMessageHeaderLine( "BT<CR><LF>" );
        f.addMessageHeaderLine( "<CLASS><CR><LF>" );
        f.setPlso ( PLSOStateEnum.EITHER );
        f.setAppropriateEndLine("<CR><LF>");
        f.addMessageFooterLine( "BT<CR><LF>" );
        f.addMessageFooterLine( "NNNN<CR><LF>");
        f.format( );
    end
```

Figure 2:
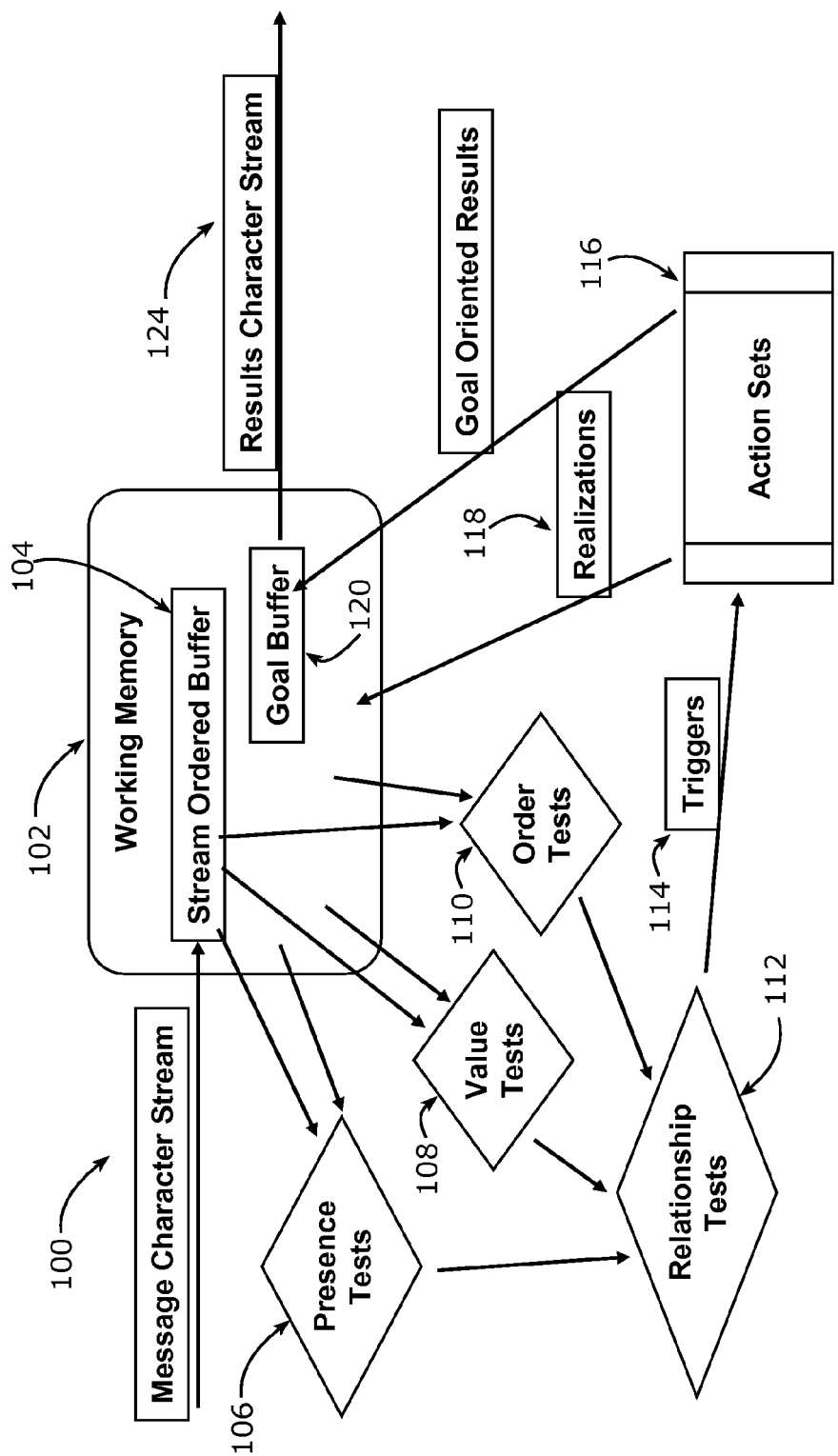
FIG. 2 is an illustration showing illustrative internal operational states and transitions of the preferred embodiment.

FIG. 2 is a state/transition model in accordance with the preferred embodiment showing the Message Character Stream 100 entering the working memory 102 into a stream ordered buffer 104 with transitions to presence, value, and order tests 106, 108, and 110, respectively, transitioning into relationship tests 112 with triggers 114 provided to action sets 116 and the realizations 118 thereof provided to the working memory and goal buffer 120 to output the results character stream 124.

The above functional organization allows a relatively small set of expandable production rules to define formatting and parsing actions for a given message even if there is a multitude of acceptable variations within the original message and/or encoded message, respectively.

As will be apparent to those skilled in the art, various changes and modifications may be made to the illustrated embodiment of the present invention without departing from the spirit and scope of the invention as determined in the appended claims and their legal equivalent.

The invention claimed is:

1. A system for the processing of the characters of an input message in accordance with pre-determined format rules, comprising:

a rules execution engine having an input for receiving an input message and having an output, the rules execution engine for executing one or more processing production rules that alter the format of the input message and for providing the so-altered input message as an output thereof; and an extensible production rule set containing therein a plurality of production rules each having a criteria triggerable by more or characters of the input message to cause execution of that so-triggered rule by the rules execution engine to alter the format of the input message in accordance with an action function or the action functions of the so-triggered rule wherein each production rule includes a left-hand side having a condition or criteria that can be selectively triggered by one or more characters of the input message and a corresponding right-hand side having one or more executable format-altering action functions, a rule, when the left-hand side is fired or triggered by one or more characters of the input message, being executed by the rules execution engine to cause the corresponding execution of the action function or action functions of the right-hand side to alter the format of the message.

2. The system of claim 1, wherein the rules execution engine and the production rule set are logically separated.

3. The system of claim 1, further comprising a goal sub-function to detect and resolve inconsistencies in the direction of the output.

4. A system for the processing of the characters of an input message in accordance with pre-determined format rules, comprising:

a rules execution engine having an input for receiving an input message and having an output, the rules execution engine for executing one or more processing production rules that alter the format of the input message and for providing the so-altered input message as an output thereof; and an extensible production rule set containing therein a plurality of production rules each having a criteria triggerable by one more or characters of the input message to cause execution of that so-triggered rule by the rules execution engine to alter the format of the input message in accordance with an action function or the action functions of the so-triggered rule wherein each production rule includes a first side having a condition or criteria that can be selectively triggered by one or more characters of the input message and a corresponding second side having one or more executable format-altering action functions, a rule, when the first side is fired or triggered by one or more characters of the input message, being executed by the rules execution engine to cause the corresponding execution of the action function or action functions of the second side to alter the format of the message.

5. The system of claim 4, wherein the rules execution engine and the production rule set are logically separated.

6. The system of claim 4, further comprising a goal sub-function to detect and resolve inconsistencies in the direction of the output.

7. A system for the processing of the characters of an input message in accordance with pre-determined format rules, comprising:

a rules execution engine having an input for receiving an input message and having an output, the rules execution engine for executing one or more processing production rules that alter the format of the input message and for providing the so-altered input message as an output thereof; and an extensible production rule set containing therein a plurality of production rules each having a criteria triggerable by one more or characters of the input message to cause execution of that so-triggered rule by the rules execution engine to alter the format of the input message in accordance with an action function or the action functions of the so-triggered rule.

* * * * *